US012587566B2

(12) United States Patent
Locar et al.

(10) Patent No.: US 12,587,566 B2
(45) Date of Patent: **\*Mar. 24, 2026**

(54) DETECTING SUSPICIOUS ENTITIES

(71) Applicant: PayPal, Inc., San Jose, CA (US)

(72) Inventors: Iulian-Corneliu-Ran Locar, Tel Aviv (IL); Tomer Handelman, Givatayim (IL)

(73) Assignee: PayPal, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/806,503

(22) Filed: Aug. 15, 2024

(65) Prior Publication Data

US 2025/0088533 A1 Mar. 13, 2025

Related U.S. Application Data

(63) Continuation of application No. 17/811,297, filed on Jul. 7, 2022, now Pat. No. 12,101,353.

(51) Int. Cl.
H04L 9/40 (2022.01)
(52) U.S. Cl.
CPC ................................ H04L 63/1483 (2013.01)
(58) Field of Classification Search
None
See application file for complete search history.

(56) References Cited

U.S. PATENT DOCUMENTS

| | | | | |
|---|---|---|---|---|
| 8,448,245 B2 * | 5/2013 | Banerjee | ................. | G06F 21/51 |
| | | | | 709/224 |
| 8,505,094 B1 * | 8/2013 | Xuewen | ................ | H04L 67/564 |
| | | | | 709/224 |
| 8,521,667 B2 * | 8/2013 | Zhu | ..................... | H04L 63/1408 |
| | | | | 706/13 |
| 8,839,418 B2 * | 9/2014 | Hulten | ................ | H04L 63/1441 |
| | | | | 726/25 |
| 9,178,901 B2 * | 11/2015 | Xue | .................... | H04L 63/1483 |
| 9,509,714 B2 * | 11/2016 | Sivan | .................... | H04L 63/101 |
| 9,516,051 B1 * | 12/2016 | Hu | ........................... | H04L 67/02 |

(Continued)

*Primary Examiner* — Backhean Tiv
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to automatically determining whether an entity is malicious. In some embodiments, a server computer system generates a feature vector for an unknown website, where generating the feature vector includes preprocessing a plurality of structural features of the unknown website. In some embodiments, the system inputs the feature vector for the unknown website into a trained neural network. In some embodiments, the system applies a clustering algorithm to a signature vector for the unknown website and signature vectors for respective ones of a plurality of known websites output by the trained neural network. In some embodiments, the system determines, based on results of the clustering algorithm indicating similarities between signature vectors for the unknown website and one or more of the signature vectors for the plurality of known websites, whether the unknown website is suspicious. Determining whether the entity is suspicious may advantageously prevent malicious (fraudulent) activity.

20 Claims, 9 Drawing Sheets

(56)　　References Cited

U.S. PATENT DOCUMENTS

| | | | |
|---|---|---|---|
| 10,148,681 B2 * | 12/2018 | Banerjee | H04L 63/1441 |
| 10,404,745 B2 * | 9/2019 | Verma | G06N 20/20 |
| 10,778,702 B1 * | 9/2020 | Huang | G06F 16/285 |
| 10,805,346 B2 * | 10/2020 | Kumar | H04L 63/0227 |
| 10,846,403 B2 * | 11/2020 | Finkelshtein | G06N 20/00 |
| 10,909,594 B2 | 2/2021 | Handelman | |
| 10,944,789 B2 * | 3/2021 | Correa Bahnsen | |
| | | | H04L 63/1483 |
| 11,321,375 B2 | 5/2022 | Margolin et al. | |
| 11,336,689 B1 * | 5/2022 | Miramirkhani | H04L 63/0281 |
| 11,381,598 B2 * | 7/2022 | Nunes | G06N 3/091 |
| 11,399,288 B2 * | 7/2022 | Jochem Sanz | H04L 63/1433 |
| 11,463,476 B2 * | 10/2022 | Liu | G06F 16/353 |
| 11,522,877 B2 * | 12/2022 | McLean | H04L 63/1416 |
| 11,671,448 B2 * | 6/2023 | Nunes | H04L 63/1433 |
| | | | 726/1 |
| 11,799,905 B2 * | 10/2023 | Jones | G06F 16/9566 |
| 11,882,130 B2 * | 1/2024 | Szurdi | G06F 21/12 |
| 11,943,257 B2 * | 3/2024 | Jung | G06F 9/547 |
| 12,101,353 B2 * | 9/2024 | Locar | H04L 63/1483 |
| 2010/0186088 A1 * | 7/2010 | Banerjee | H04L 63/1433 |
| | | | 709/224 |
| 2015/0067853 A1 * | 3/2015 | Amrutkar | H04L 63/1466 |
| | | | 726/23 |
| 2020/0311265 A1 * | 10/2020 | Jones | G06F 16/9566 |
| 2020/0401633 A1 | 12/2020 | Meron et al. | |
| 2021/0201331 A1 | 7/2021 | Handelman et al. | |
| 2021/0326881 A1 | 10/2021 | Handelman | |
| 2021/0336952 A1 | 10/2021 | Margolin et al. | |
| 2022/0027921 A1 | 1/2022 | Handelman et al. | |
| 2022/0108137 A1 | 4/2022 | Margolin et al. | |
| 2023/0259625 A1 * | 8/2023 | Gechman | G06N 20/20 |
| | | | 726/23 |
| 2023/0291751 A1 * | 9/2023 | Wasicek | H04L 63/1425 |
| 2023/0319108 A1 * | 10/2023 | Gechman | G06N 3/045 |
| | | | 726/22 |
| 2023/0353585 A1 * | 11/2023 | Wan | H04L 63/1425 |
| 2024/0015180 A1 * | 1/2024 | Locar | H04L 63/1483 |
| 2024/0020476 A1 * | 1/2024 | Singh | G06F 40/30 |
| 2024/0073225 A1 * | 2/2024 | Chiaraviglio | H04L 63/1441 |
| 2025/0088533 A1 * | 3/2025 | Locar | H04L 63/1483 |

* cited by examiner

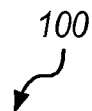
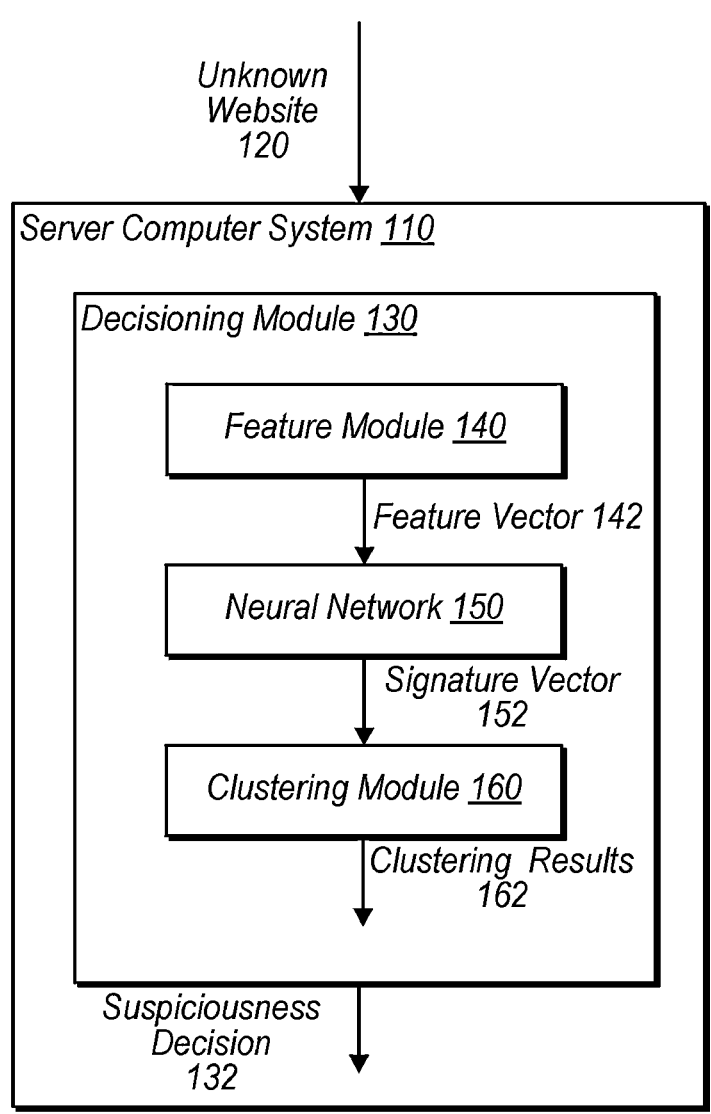
*Fig. 1*

*Decisioning Module*
*130*
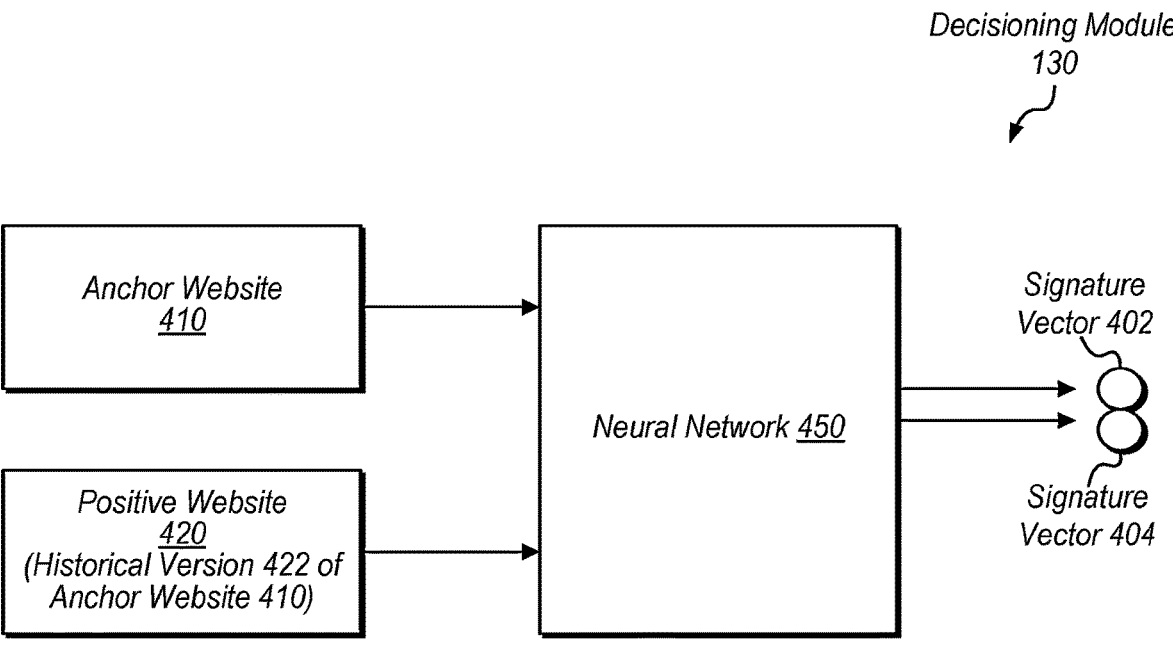
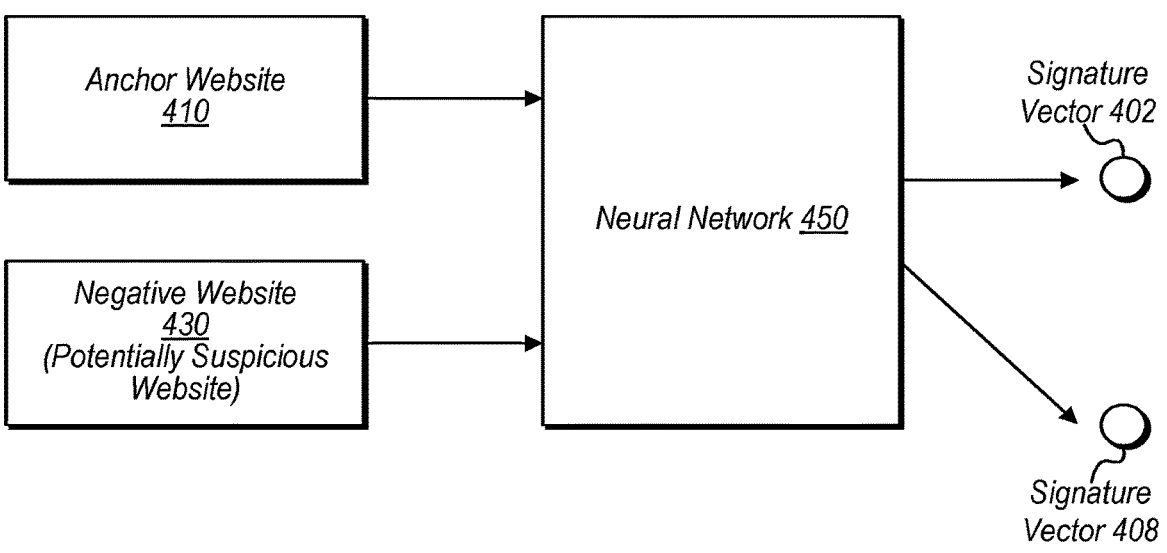
*Fig. 4*

Decisioning
Module 130

Clustering
Scores 642

Machine Learning
Classifier 270

Classification
672

Training Module
610

Training
Instructions
612

Clustering Scores
644
(For Unknown
Website 620)

Trained Machine
Learning Classifier
675

Classification
622
(For Unknown
Website 620)

*Method*
*600*

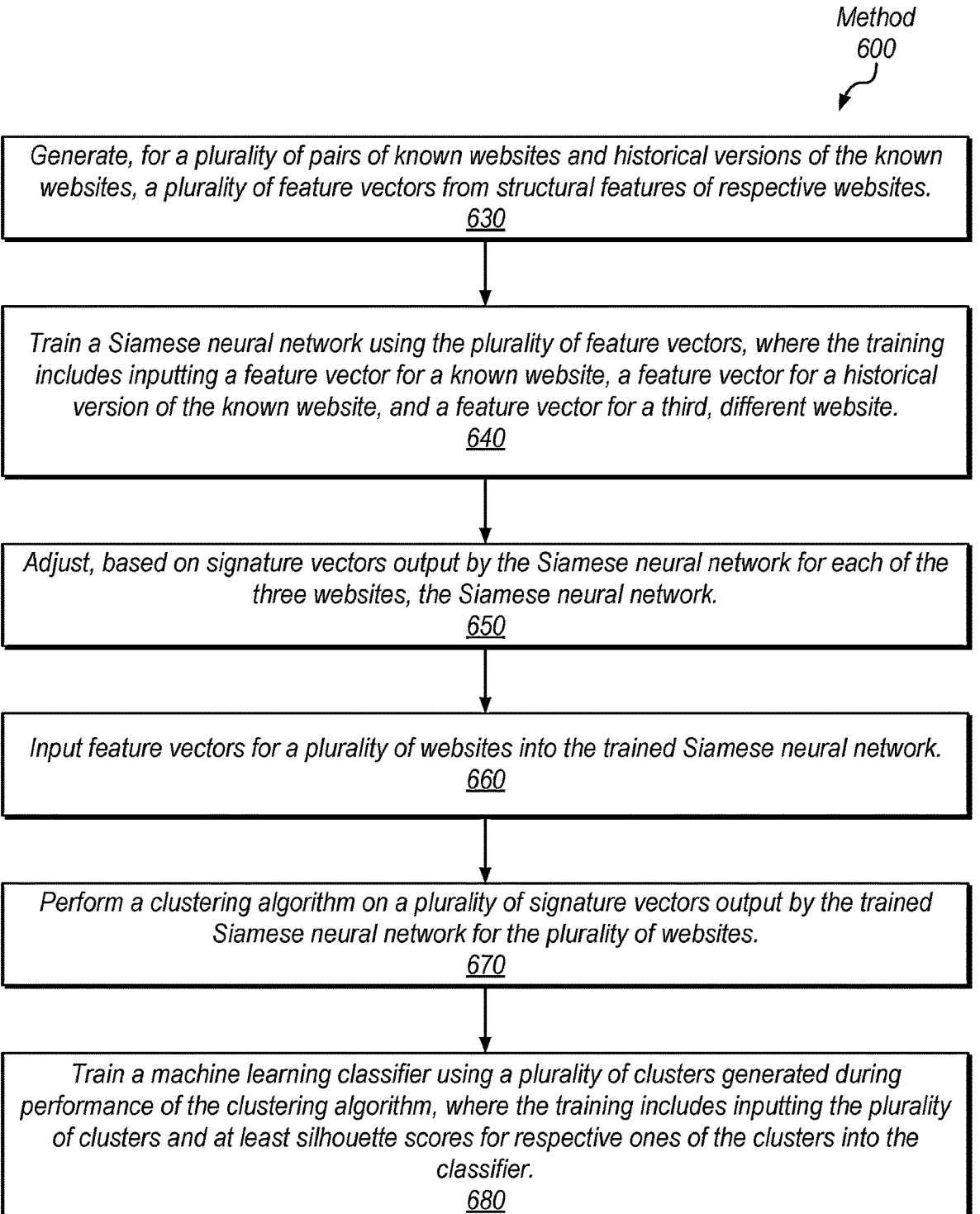

Generate, for a plurality of pairs of known websites and historical versions of the known websites, a plurality of feature vectors from structural features of respective websites.
630

Train a Siamese neural network using the plurality of feature vectors, where the training includes inputting a feature vector for a known website, a feature vector for a historical version of the known website, and a feature vector for a third, different website.
640

Adjust, based on signature vectors output by the Siamese neural network for each of the three websites, the Siamese neural network.
650

Input feature vectors for a plurality of websites into the trained Siamese neural network.
660

Perform a clustering algorithm on a plurality of signature vectors output by the trained Siamese neural network for the plurality of websites.
670

Train a machine learning classifier using a plurality of clusters generated during performance of the clustering algorithm, where the training includes inputting the plurality of clusters and at least silhouette scores for respective ones of the clusters into the classifier.
680

*Fig. 6C*

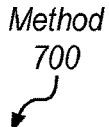

*Method*
*700*

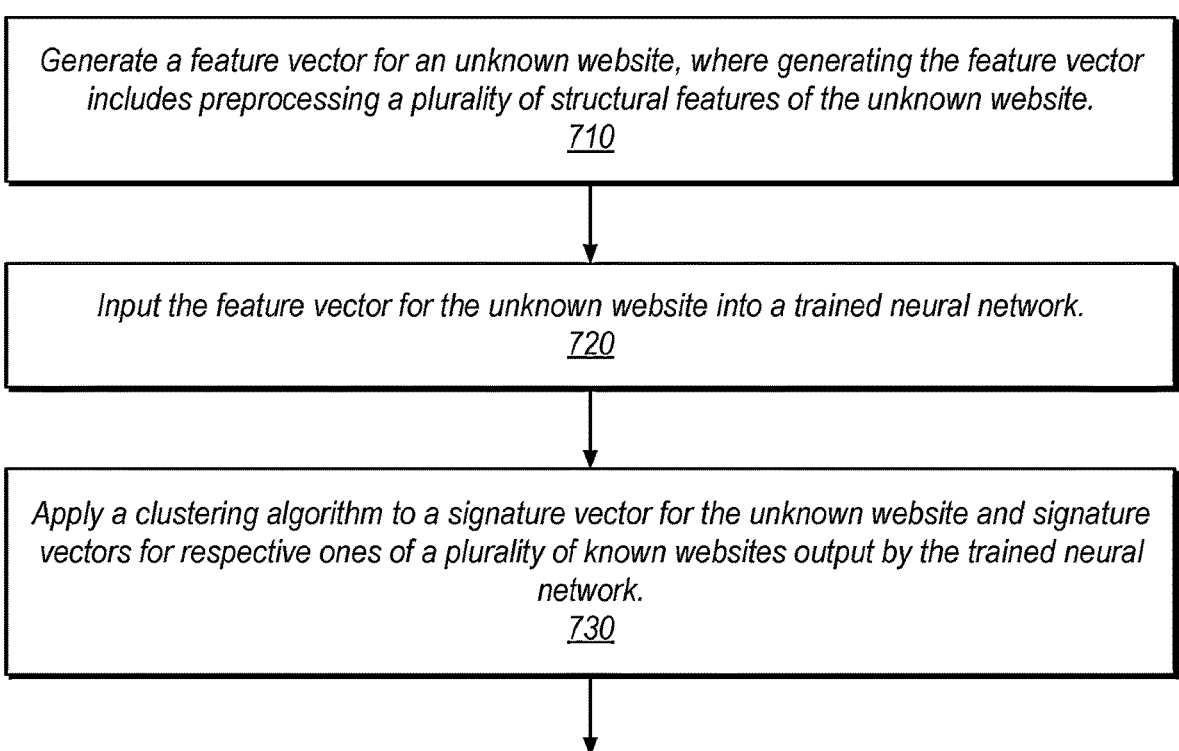

*Generate a feature vector for an unknown website, where generating the feature vector includes preprocessing a plurality of structural features of the unknown website.*
*710*

*Input the feature vector for the unknown website into a trained neural network.*
*720*

*Apply a clustering algorithm to a signature vector for the unknown website and signature vectors for respective ones of a plurality of known websites output by the trained neural network.*
*730*

*Determine, based on results of the clustering algorithm indicating similarities between signature vectors for the unknown website and one or more of the signature vectors for the plurality of known websites, whether the unknown website is suspicious.*
*740*

*Fig. 7*

DETECTING SUSPICIOUS ENTITIES

CROSS REFERENCE TO RELATED APPLICATION

The present invention is a continuation of U.S. patent application Ser. No. 17/811,297, filed Jul. 7, 2022, the disclosure of which is incorporated herein by reference in its entirety.

BACKGROUND

Technical Field

This disclosure relates generally to data security, and, more specifically, to techniques for detecting whether an entity (e.g., a website) is a suspicious or copycat entity.

Description of the Related Art

As more and more transactions are conducted electronically via online transaction processing systems, for example, these processing systems become more robust in managing transaction data as well as detecting suspicious and unusual behavior. Many user requests (e.g., login request, transaction requests, requests to access private data, etc.), for example, may be generated with malicious intent or may be elicited from end users via a malicious entity, which may result in wasted computer resources, network bandwidth, storage, CPU processing, monetary resources, etc., if those requests are processed. Some transaction processing systems attempt to analyze various user activity, including both previous and current user activity to identify and mitigate malicious behavior such as requests for fraudulent transactions.

BRIEF DESCRIPTION OF THE DRAWINGS

FIG. 1 is a block diagram illustrating an example system configured to identify whether an unknown website is suspicious, according to some embodiments.

FIG. 4 is a block diagram illustrating example neural network training, according to some embodiments.

FIG. 6C is a flow diagram illustrating a method for training both a Siamese neural network and a machine learning classifier, according to some embodiments.

FIG. 7 is a flow diagram illustrating a method for determining whether an unknown entity is a suspicious entity, according to some embodiments.

DETAILED DESCRIPTION

Figure 2:
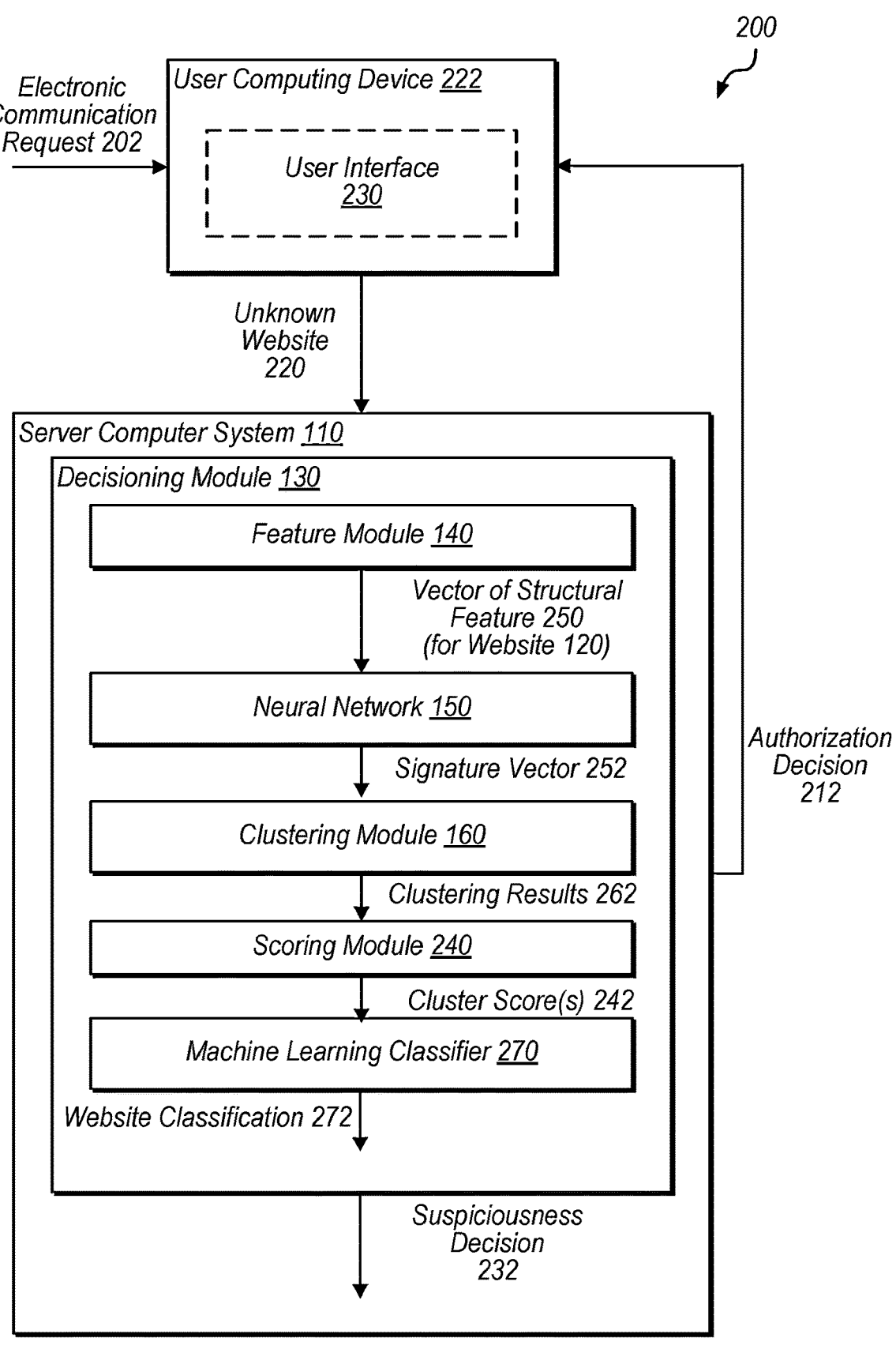
FIG. 2 is a block diagram illustrating an example system configured to perform a preventative action in response to generating a suspiciousness decision for a transaction request initiated via an unknown website, according to some embodiments.

In various situations, malicious entities generate numerous fake, copycat websites that appear similar to known websites of legitimate entities, for example, in an attempt to cause end users to engage in unsecure electronic communications via the copycat website. Such situations may cause end users to lose resources (e.g., monetary resources) when engaging with these copycat websites. As one specific example, if an end user completes an online electronic transaction via a copycat website that looks like a legitimate merchant's website, then the end user may lose monetary funds while not receiving goods or services they believed they would be obtaining via the transaction. In this example, the entity behind copycat website extracts funds from end users by posing as legitimate merchants (which the end users likely trust) without actually providing goods or services in such electronic transactions. The disclosed electronic communication processing system attempts to detect and prevent electronic communications attempted via copycat or suspicious websites.

The disclosed techniques apply a neural network trained using structural features of known websites in combination with clustering to detect suspicious (e.g., fraudulent) websites in order to prevent or reduce malicious activity (e.g., phishing) attempted via such websites. For example, the disclosed techniques accomplish website security by identifying groups of seemingly different websites (e.g., that include differing text, media, etc.) but that share a set of structural features (e.g., cascading style sheets (CSS) classes, JavaScript libraries, hypertext markup language (HTML) tags, etc.) with a known malicious website. That is, the disclosed techniques attempt to identify copycat websites attempting to look like a known legitimate website (e.g., that visually appear the same as the legitimate website to an end user) but that do not have the same structural features as the legitimate website. For example, a suspicious website is unlikely to include tracking mechanisms as this feature is expensive to implement, whereas many legitimate websites include tracking mechanisms.

Through the use of both a neural network and clustering techniques, the disclosed techniques provide real-time detection of suspicious websites. For example, instead of authorizing an action requested by a user at their device via the unknown website and then evaluating the unknown website after the action is complete, the disclosed techniques detect whether the unknown website is suspicious in response to receiving the action request and prior to authorizing the requested action. That is, the suspiciousness detection is performed as part of the authorization determination process for the requested action. As one specific real-time scenario, upon receipt of a transaction request, the disclosed risk detection system may crawl the website at which the transaction request was initiated to gather features for the website, embed the website features into a latent space, assign the embedded features of the website to a cluster based on its positioning within the latent space, and then predict whether the website is suspicious based on the cluster to which it was assigned. As used herein, the term "latent space" or "embedding space" is intended to be construed according to its well-understood meaning, which includes a k-dimensional space in which embeddings of sets of items are positioned, where sets of items which resemble one another are more closely positioned within the space than sets of items which do not resemble one another.

In order to automatically detect suspicious websites in real-time (e.g., at the time a transaction is initiated from a malicious website), the disclosed techniques use machine learning in combination with clustering. Such techniques may advantageously allow for suspicious website detection when a transaction is initiated instead of having to wait until a transaction is complete and has been reported by an end user (e.g., resulting in loss in terms of both computing and monetary resources). Further, the disclosed techniques may advantageously improve the accuracy with which the disclosed detection system identifies suspicious websites. This, in turn, allows the disclosed system to quickly and accurately prevent malicious websites from tricking end users into participating in unsecure electronic communications (e.g., fraudulent transactions). Thus, the disclosed techniques may advantageously improve the catch rate of systems processing electronic communications, thereby improving the security of such systems. In some embodiments, detection systems using the disclosed machine learning techniques execute the clustering in an offline manner for a given entity and then apply restrictions or limitations on an entity based on the results of the clustering.

Broadly speaking, the term "structural features" is intended to refer to aspects of a website that are not related to the visual content of the website, but rather the structural or back-end features of a website. Accordingly, website features, in disclosed techniques, can be placed in two categories: content features that related e.g., to text, formatting, visual appearance, etc. and structural features which are non-content features relating to one or more characteristics of a website such as the organization or functioning of the website. Structural features are discussed in further detail below with reference to FIG. 3.

Example Server Computer System

FIG. 1 is a block diagram illustrating an example system configured to identify whether an unknown website is suspicious. In the illustrated embodiment, a system 100 includes a server computer system 110 that includes a decisioning module 130, which in turn includes feature module 140, neural network 150, and clustering module 160.

In the illustrated embodiment, server computer system 110 receives an unknown website 120. For example, the server computer system 110 may be a risk detection system that determines whether websites are suspicious. The unknown website 120 may be one from which a user has initiated a transaction as discussed in further detail below with reference to FIG. 2. Unknown website 120 has not been evaluated by server computer system 110 and, thus, is not known to be suspicious yet (e.g., has not been classified as suspicious or not). Server computer system 110 inputs the unknown website 120 into decisioning module 130 which generates and outputs a suspiciousness decision 132. For example, suspiciousness decision 132 may indicate that the unknown website 120 is a copycat website (e.g., a phishing website attempting to fool end users into providing private, sensitive data). In some embodiments, server computer system 110 performs a preventative action based on the suspiciousness decision 132. For example, if an unknown website is suspicious, system 110 may block this website in order to prevent further, potentially fraudulent, activity at this website.

Decision module 130, in the illustrated embodiment, executes feature module 140 in order to generate a feature vector 142 for the unknown website 120. Feature module 140 extracts a set of structural features from unknown website 120 and performs preprocessing on the set of structural features to generate a feature vector for the unknown website. In some embodiments, feature module 140 extracts both structural and visual features from unknown website 120 and includes both of these features in the feature vector 142 for the website. The preprocessing may include various preprocessing techniques, including normalization, encoding, transformation, etc. Example structural features are discussed in further detail below with reference to FIG. 3.

Neural network 150, in the illustrated embodiment, receives a feature vector 142 from feature module 140 and generates a signature vector 152 for the unknown website 120 based on feature vector 142. For example, neural network 150 may be a trained Siamese network, contrastive loss network, etc. The neural network 150 is a trained neural network (trained by server computer system 110 or another computer system) that is executed by decision module 130 to determine signature vectors for various websites based on feature vectors output by feature module 140. A signature vector 152 output by network 150 for the unknown website 120 may be similar to a signature vector output by network 150 for another, different website that has similar features to the unknown website 120.

Clustering module 160, in the illustrated embodiment, receives signature vector 152 from neural network 150 generated for unknown website 120 and generates clustering results 162 for signature vector 152 and a plurality of other signature vectors (not shown) output by neural network 150 for a plurality of other, known websites (e.g., known to be suspicious or not suspicious based on prior classification). Clustering module 160 may implement any of various clustering algorithms on signature vectors output by neural network 150 to provide clusters of websites that have similar (e.g., structural) features. For example, clustering module 160 may execute one or more of the following types of clustering algorithms: a density-based spatial clustering of applications with noise (DBSCAN), a k-means clustering, a mean shift, a gaussian mixture model, etc.

Decision module 140 generates a suspiciousness decision 132 based on clustering results 162 output by clustering module 160 indicating whether unknown website 120 has similar features to other, known websites. For example, suspiciousness decision 132 may indicate that unknown website 120 is suspicious based on this website having similar features to other websites that are known to be suspicious. Alternatively, suspiciousness decision 132 may indicate that unknown website 120 is not suspicious based on this website having similar features to websites that are known to be not suspicious. In some embodiments, based on suspiciousness decision 132 output by decision module 130, server computer system 110 performs an action relative to unknown website 120. Example situations in which system 110 performs such actions are discussed in further detail below with reference to FIG. 2, including preventative action (i.e., based on unknown website 120 being suspicious).

Note that various examples herein classify an unknown website e.g., at which a user is requesting authorization of an electronic communication, but these examples are discussed for purposes of explanation and are not intended to limit the scope of the present disclosure. In other embodiments, any of various types of entities, including websites, users, accounts, electronic communications, merchants, applications, etc. may be evaluated using the disclosed detection system to determine whether the entity is trustworthy e.g., and that an electronic communication initiated via that entity should be authorized, including determining whether the entity is suspicious (and potentially malicious).

In this disclosure, various "modules" operable to perform designated functions are shown in the figures and described in detail (e.g., decisioning module 130, feature module 140, clustering module 160, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized application-specific integrated circuit (ASIC).

Example Website Detection

FIG. 2 is a block diagram illustrating an example system configured to perform a preventative action in response to generating a suspiciousness decision for an electronic communication request initiated via an unknown website. In the illustrated embodiment, system 200 includes user computing device 222, which includes a user interface 230, and server computer system 110, which includes feature module 140, neural network 150, clustering module 160, scoring module 240, and machine learning classifier 270.

User computing device 222, in the illustrated embodiment, receives an electronic communication request 202 via user interface 230 from an end user. User interface 230 displays a website to the user and the end user may request an electronic communication at the website. For example, a user may request to initiate an electronic transaction (e.g., with a merchant) at the unknown website 220 (e.g., a webpage of the website) displayed via user interface 230. User computing device 222 transmits information for unknown website 220 to server computer system 110. In some embodiments, this information includes details for the electronic communication request 202 as well as details for the website itself. For example, the information transmitted from device 222 to system 110 may include an authorization request for the electronic communication in addition to details for unknown website 220. In some situations, server computer system 110 scrapes content from unknown website 120 in order to determine features of the website for use in suspiciousness detection.

Feature module 140, in the illustrated embodiment, generates a vector 250 of structural features for website 220, which is then used by neural network 150 to generate signature vector 252. Clustering module 160 performs a clustering algorithm on signature vector 252 and signature vectors of various other websites. Clustering module 160 outputs clustering results 262 to scoring module 240.

In the illustrated embodiment, based on the clustering results 262, scoring module 240 generates one or more cluster scores 242. For example, scoring module 240 generates silhouette scores for various clusters generated by clustering module 160. A silhouette score output by module 240 for a cluster in which the unknown website 220 is included may indicate the quality of that cluster. A high-quality cluster, for example, may be one with a high silhouette score, indicating that this is a dense cluster with signature vectors being very similar (the signature vectors are densely packed within the cluster). As discussed in further detail below with reference to FIG. 5, if unknown website 220 is included in a high-quality cluster (one having a high silhouette score), this may be indicative that the unknown website 220 is suspicious based on one or more other signature vectors for other websites being known suspicious websites. Scoring module 240 may generate various other types of cluster scores 242. The different cluster scores 242 generated by cluster module 240 may be included in a set of features for the cluster. For example, a set of features for a given cluster may include one or more of the following features: a percentage of known suspicious websites in the cluster, a silhouette score for the cluster, a size of the cluster, distances between signature vectors within the cluster, distances between the cluster and other, different clusters, etc.

Machine learning classifier 270, in the illustrated embodiment, receives one or more cluster scores 242 from scoring module 240 and generates a classification 272 for the website based on the one or more scores. In some situations, classifier 270 determines whether unknown website 220 is suspicious based on a silhouette score for the website. In other situations, classifier 270 may be trained to generate a classification for the unknown website 220 based on multiple different cluster scores 242.

Decision module 170, in the illustrated embodiment, generates a suspiciousness decision 232 for the unknown website 220 based on the classification 272 output by classifier 270 for the website. Based at least on the decision 232, server computer system 110 makes an authorization decision 212 for request 202 and transmits the decision to user computing device 222. For example, system 110 may determine to authorize the electronic communication requested by the user based on determining that the unknown website 220 is not suspicious (i.e., the website is a legitimate, trusted website). As one specific example, if a user is requesting to complete a transaction with a merchant at a legitimate website (and not a copycat website) of the merchant, then a transaction processing system (one example of server computer system 110) may authorize the transaction requested by the user via user interface 230. In other situations, system 110 may determine that the unknown website 220 is suspicious and may perform one or more preventative actions in addition to sending an authorization decision 212 to device 222 indicating that the request 202 has been denied. Such preventative actions may include blocking the suspicious website for potential future communications initiated at this website, reporting the website, etc.

Example Feature Module

Figure 3:
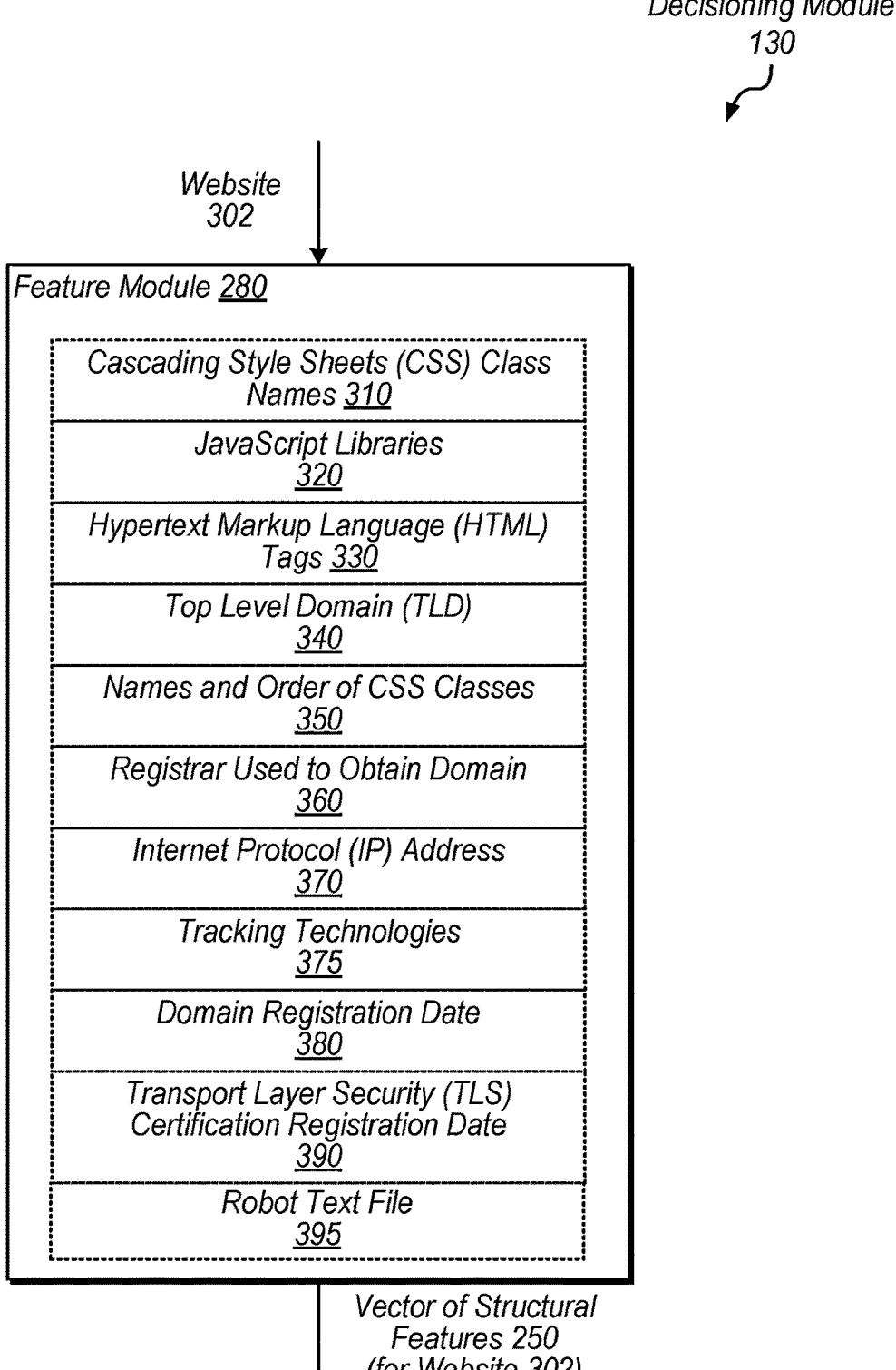
FIG. 3 is a block diagram illustrating an example feature module, according to some embodiments.

FIG. 3 is a block diagram illustrating an example feature module. In the illustrated embodiment, various structural features preprocessed and included in a vector 250 by feature module 280 for website 302 are shown. In response to receiving website 302, feature module 280 extracts and preprocesses the following structural features: CSS class names 310, JavaScript libraries 320, HTML tags 330, top level domain (TLD) 340 of the website (e.g., .tk, .ml, .ga, .shop, .store, .com, .gov, etc.), names and order of CSS classes appearing on the website 350, registrar 360 used to register the domain, an internet protocol (IP) address 370 of the website, tracking technologies 375 present on the website (e.g., Google Analytics™ tags), domain registration date 380 (obtained from certificate transparency logs), transport layer security (TLS) certificate registration date 390, a robots.txt file 395 for the website, etc. In various embodiments, the structural features may be scraped from a given webpage of a website (e.g., the webpage from which a user initiates an electronic transaction) or may be scraped from multiple webpages or robots.txt files of the given website.

In addition to extracting structural features from website 302, feature module 280 performs one or more preprocessing techniques on the features prior to outputting a vector 250 of the structural features. For example, feature module 280 may bin the domain registration date of the website 302 during preprocessing of the structural features. The binning performed by feature module 280 may be performed in order to capture the time proximity of domains for a specific fraudulent campaign or event being attempted from website domains that are registered close together. For example, when an entity is attempting to perform fraudulent activity within a given time period (e.g., within a few days, weeks, months), they may register a set of new domains for this campaign. The preprocessing includes at least one of normalization, encoding, and transformation.

Evaluation of structural features for websites may be advantageous (e.g., over evaluation of visual website features) due to the difficulty and expense associated with altering structural features. For example, it may be more time consuming for a website developer to alter structural features for a website than to alter visual features. In other situations, certain structural features may be undesirable for a malicious entity to include in their copycat websites. For example, structural features such as tracking technologies are often absent from malicious websites due to malicious entities not wanting to be tracked (while it is common for legitimate websites to include tracking).

Example Neural Network

FIG. 4 is a block diagram illustrating example neural network training. Decisioning module 130 inputs two different sets of websites into neural network 450 during training. During training, decisioning module 130 generates and inputs a plurality of feature vectors for a plurality of different websites into neural network 450 and adjusts neural network based on signature vectors output by the network during training. In some embodiments, the neural network 450 shown in FIG. 4 is a Siamese neural network with triplet loss.

Decisioning module 130 generates and inputs feature vectors for an anchor website 410 (for which a suspiciousness classification is known e.g., anchor website is not suspicious) and a positive website 420 (which is a historical version 422 of anchor website 410). In this example, anchor website 410 may be a current version PayPal.com™, while positive website 420 may be an older, historical version of PayPal.com e.g., from a year prior to the current version. In other situations, decisioning module 130 selects positive website 420 to be a version of PayPal.com from another country, for example.

Neural network 450 outputs signature vectors 402 and 404 for anchor website 410 and positive website 420, respectively. Decisioning module 130, in the illustrated embodiment, inputs a second set of feature vectors, for anchor website 410 and negative website 420 (for a potentially suspicious website) into neural network 450. In the illustrated embodiment, neural network 450 outputs signature vector 402 for anchor website 410 and signature vector 408 for negative website 420. Negative website 430, may also be referred to as a positive website, which may be any website sample that does not belong to the same entity as anchor website 410 (e.g., a non-PayPal website).

In order to train neural network 450, decisioning module 130 generates a set of training data, which includes features scraped from e.g., millions of websites for which the decisioning module 130 has obtained historical crawls (i.e., the decisioning module 130 or some other module previously scraped features from historical versions of the millions of websites). The set of training data may include feature vectors for both websites that are known to be suspicious and legitimate websites. The training data is separated into triplets by decisioning module 130, where for a given current website X (an anchor website), and another, different website Y (a negative website), module 130 generates a triplet that includes: a feature vector for website X, a feature vector for a historical version of website X, and a feature vector for website Y. During training, decisioning module 130 alters neural network 450 such that, for the triplet, the unique signature vectors output by the network for website X and the historical version of website X are close to each other within a latent space (e.g., indicating they were generated by the same entity) and the signature vectors output by the network for website X and website Y will be far from each other within the latent space. In various embodiments, the weights are altered in order to minimize the loss calculated in the loss function (e.g., either triplet loss or contrastive loss). As shown in FIG. 4, the signature vectors output by network 450 for anchor website 410 (of which website X is one example) and positive website 420 (of which the historical version of website X is one example) are near one another, while the signature vectors for anchor website 410 and negative website (of which website Y is one example) are far from one another in the latent space.

While Siamese neural networks may be used to create unique signatures for images of users faces in order to perform facial recognition, such techniques compare two images to see if they are similar. The disclosed techniques train a Siamese neural network to generate unique signatures for websites by introducing a third, negative website example (e.g., an anchor website, a historical website, and a negative website). Use of a Siamese neural network in disclosed techniques generates unique signatures for websites based on structural features of the website. The use of structural website features as input to a Siamese neural network that is trained on structural features of various websites in combination with clustering techniques (discussed in further detail below) may advantageously allow the disclosed detection system to automatically identify suspicious websites. Further, the clustering of signatures vectors output by the Siamese neural network performed in disclosed techniques advantageously allows for accurate identification of suspicious websites via the identification of high quality suspicious clusters or high quality clusters that are not suspicious. For example, in computer vision scenarios, given a vector representing a person's face, the vector closest to this vector in the embedding space will be compared to the given vector in order to identify if these two images are of the same person. In disclosed techniques, vector embeddings are clustered and then high quality clusters are observed to identify whether new embeddings (e.g., within these clusters) are suspicious or not.

Example Clustering

Figure 5:
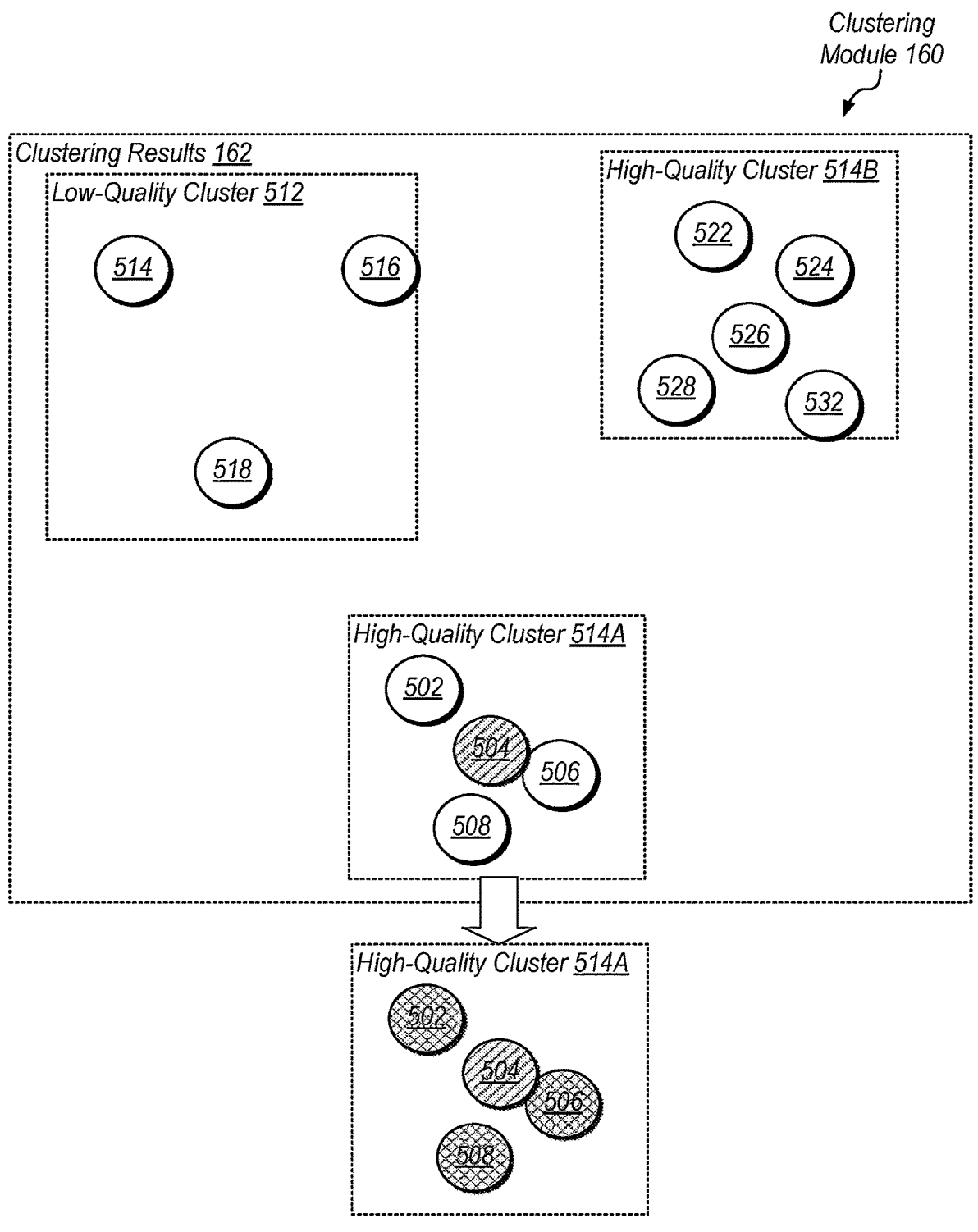
FIG. 5 is a diagram illustrating example clustering, according to some embodiments.

FIG. 5 is a diagram illustrating example clustering. In the illustrated embodiment, clustering results 162 output by clustering module 160 are shown. The clustering results 162 include three different clusters: a low-quality cluster 512, a high-quality cluster 514A and a high-quality cluster 514B. In the illustrated embodiment, low-quality cluster 512 includes three signature vectors 514, 516, and 518. High-quality cluster 514B includes five signature vectors 522, 524, 526, 528, and 532. High-quality cluster 514A includes four signature vectors 502, 504, 506, and 508.

In some embodiments, after generating clusters 512, 514A, and 514B, clustering module 160 determines whether they are high quality or low quality based on calculating silhouette scores for the clusters. For example, cluster 512 is low quality based on its signature vectors being far apart, while cluster 514A is a high quality cluster based on its signature vectors being close together. Closeness of signature vectors within a cluster may be relative to the closeness of signature vectors in other clusters. For example, the silhouette score for cluster 512 may be determined based on comparing the distances between vectors in cluster 512 with distances between vectors in cluster 514B.

In the illustrated embodiment, high-quality cluster 514A includes a shaded signature vector 304 and three non-shaded signature vectors 502, 506, and 508. Signature vector 504 is shaded based on the website corresponding to this vector being a known suspicious (e.g., malicious) website. Based on vector 504 corresponding to a known suspicious website and based on this vector 504 being in close-proximity to vectors 502, 506, and 508 (e.g., this cluster has a high silhouette score), decisioning module 130 (discussed above with reference to FIGS. 1-4) marks the rest of the vectors in cluster 514A as corresponding to possibly suspicious websites. For example, in FIG. 5, vectors 502, 506, and 508 have been shaded using crosshatching to indicate that they may also correspond to e.g., fraudulent websites. The shading of these vectors indicates that they were probably generated by the same malicious entity that generated the known suspicious website (since the websites have similar signatures to the known suspicious website). As discussed in further detail below with reference to FIG. 6B, decisioning module 130 may determine that vectors 502, 506, and 508 are also suspicious using a trained machine learning classifier.

Example Machine Learning Classifier

Figure 6A:
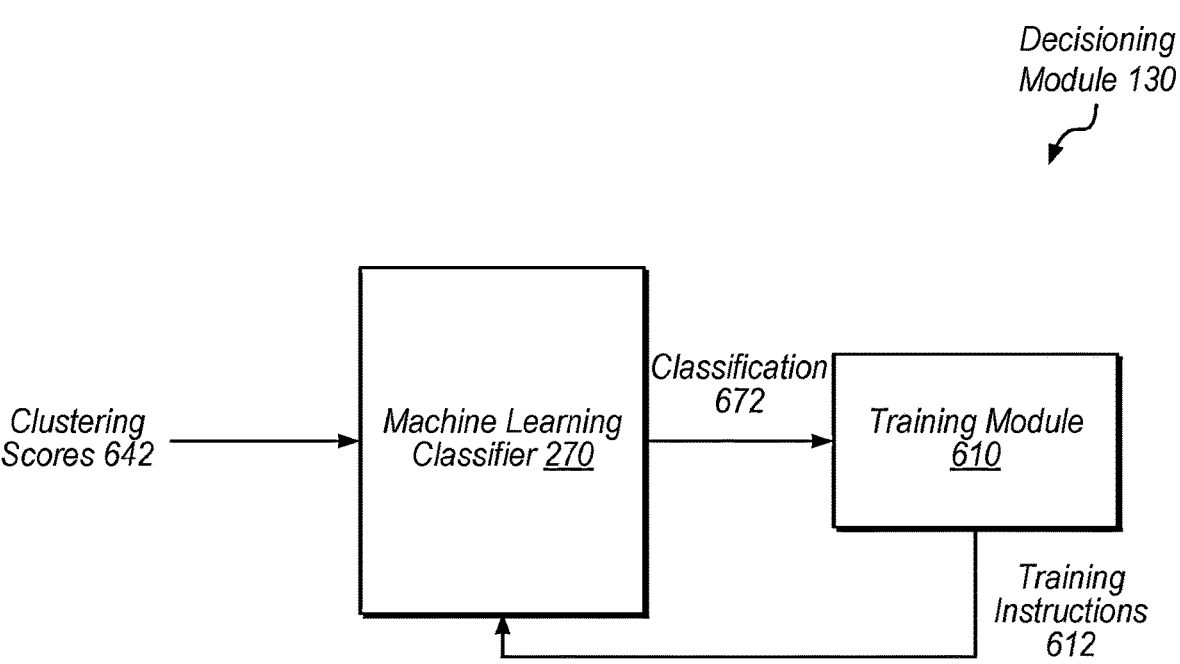
FIGS. 6A and 6B are block diagrams illustrating training and use of a machine learning classifier, according to some embodiments.
Figure 6B:
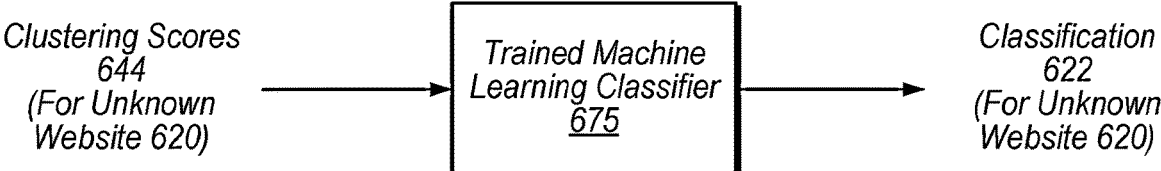

FIGS. 6A and 6B are block diagrams illustrating training and use of a machine learning classifier. In FIG. 6A, decisioning module 130 includes a training module 610 and a machine learning classifier 270. The training performed by decisioning module 130 includes inputting results of clustering into a machine learning classifier and training this classifier to accurately predict whether a website is suspicious (e.g., fraudulent) or not. The machine learning classifier leans to predict classifications for websites based on the nearness of an unknown websites to other known fraudulent websites within the latent space as discussed above with reference to FIG. 5. For example, machine learning classifier 270 is trained by module 130 to predict that a website is suspicious based on this website belonging to a given entity that is creating a bunch of shell or copycat websites (e.g., based on the signature vector for this website being included in a cluster of websites corresponding to the given entity).

Decisioning module 130 inputs clustering scores 642 for a given website into machine learning classifier 270. Classifier 270 outputs a predicted classification 672 for the website based on the clustering scores. Based on comparing the classification 672 output by classifier with a known classification for the given website, training module 610 sends one or more training instructions to classifier 270. For example, the training instructions may include adjusted thresholds (e.g., a cluster distance threshold, a silhouette score threshold, etc.), adjusted weights for the classifier 270, etc. As another example, the classifier may use a percentage of "suspicious websites" out of the total number of websites included in a cluster as a feature. Further, as another example, the classifier may use the proximity in time that an entity joined a transaction processing system as a feature (e.g., different websites that started using PayPal at approximately the same time may be more suspicious). For example, the classifier is trained to identify that if the signature of a given website is close to a cluster (or included in the cluster) that includes known suspicious websites, then the given website is most likely suspicious as well. Machine learning classifier 270 may be one or more of the following types of machine learning models: logistic regression, gradient boost, random forest, Naïve Bayes, etc.

Clustering scores 642 as discussed above with reference to FIG. 2 include a set of features for the cluster in which a given website is included. For example, the set of features for the cluster includes various different scores 642 calculated by scoring module 240 for a website based on its signature vector being included in a given cluster. For example, the set of features may include a silhouette score for the cluster, a number of nodes in the cluster, distances between nodes within the cluster, distances between the cluster in which the given website is included and other clusters, etc.

In FIG. 6B, a trained machine learning classifier 675 is shown. For example, once training module 610 is satisfied with classifications output by classifier 270 for known websites during training, then training module 610 may clear classifier 270 for use as a trained machine learning classifier 675 (e.g., in production). In some embodiments, the training of classifier 270 is an ongoing process. For example, as new websites are generated, module 610 may continue to train classifier 270 on these new websites. In the illustrated embodiment, the trained classifier 675 receives clustering scores 642 for an unknown website 620 and outputs a classification 622 for the unknown website 620. The classification 622 output by trained classifier 675 indicates whether website 620 is suspicious or not. For example, the classification 622 may be a number on a scale of 0 to 1, with numbers closer to 1 indicating that the website is suspicious and numbers closer to 0 indicating that the website is not suspicious. In such situations, decisioning module 130 may have a classification threshold it compares classifications 622 output by trained classifier 675 with in order to determine whether the classification indicates suspicious or not suspicious. In other situations, the classification 622 is a binary classification (e.g., either a 0 or a 1).

Example Machine Learning Training

FIG. 6C is a flow diagram illustrating a method for training both a Siamese neural network and a machine learning classifier. The method 600 shown in FIG. 6C may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 600 is performed by server computer system 110.

At 630, in the illustrated embodiment, a server computer system generates, for a plurality of pairs of known websites and historical versions of the known websites, a plurality of feature vectors from structural features of respective websites. In some embodiments, the system generates feature vectors for triplets of websites. For example, the system may generate feature vectors for a current version of a known website, a historical version of the known website, and a third, different website, respectively, as discussed in detail above with reference to FIG. 4.

At 640, the server computer system trains a Siamese neural network using the plurality of feature vectors, where the training includes inputting a feature vector for a known website, a feature vector for a historical version of the known website, and a feature vector for a third, different website. The server computer system may train Siamese neural network on a plurality of different triplets of signature vectors for various websites.

At 650, the server computer system adjusts, based on signature vectors output by the Siamese neural network for each of the three websites, the Siamese neural network. For example, the Siamese neural network may output signature vectors as discussed above with reference to FIG. 4. In this example, if the Siamese neural network outputs signature vectors for the known website and the historical version of the known website that are similar, but a signature vector for the third, different website that is not similar, then the system may be satisfied with the training and approve Siamese network for production.

At 660, the server computer system inputs feature vectors for a plurality of websites into the trained Siamese neural network. The trained Siamese neural network outputs a plurality of signature vectors for the plurality of websites based on respective input feature vectors for the websites.

At 670, the server computer system performs a clustering algorithm on a plurality of signature vectors output by the trained Siamese neural network for the plurality of websites. The clustering algorithm may be any of various types of algorithms such as those discussed above with reference to FIG. 1 (e.g., DBSCAN, k-means, etc.).

At 680, the server computer system trains a machine learning classifier using a plurality of clusters generated during performance of the clustering algorithm, where the training includes inputting the plurality of clusters and at least silhouette scores for respective ones of the clusters into the machine learning classifier. The server computer system may also include various types of cluster scores including a number of signature vectors included in each cluster, distances between clusters, size of the cluster, etc.

Example Method

FIG. 7 is a flow diagram illustrating a method for determining whether an unknown entity is a suspicious entity, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 700 is performed by server computer system 110.

At 710, in the illustrated embodiment, a server computer system generates, a feature vector for an unknown website, where generating the feature vector includes preprocessing a plurality of structural features of the unknown website. In some embodiments, the preprocessing includes at least one of normalization, encoding, and transformation. In some embodiments, the plurality of structural features include one of more of the following types of structural features: cascading style sheets (CSS) classes, JavaScript libraries, hypertext markup language (HTML) tags. In some embodiments, the plurality of structural features include one of more of the following types of structural features: JavaScript libraries, registrar used to obtain top level domain (TLD), domain registration date, transport layer security (TLS) certification registration date. In some embodiments, the unknown entity is an unknown website, and where generating the feature vector includes preprocessing a plurality of structural features of the unknown entity, including one or more of: an IP address and tracking techniques utilized by the unknown website.

At 720, the server computer system inputs the feature vector for the unknown website into a trained neural network. In some embodiments, the trained neural network is a contrastive loss neural network. In some embodiments, training the contrastive loss neural network includes generating feature vectors for respective websites in a set of training websites, where the set of training websites includes pairs of known websites and anchor websites. In some embodiments, training the contrastive loss neural network further includes inputting, into the contrastive loss neural network, a set of training data that includes a feature vector of a given known website and feature vectors of a given pair of a known website and an anchor website. In some embodiments, training the contrastive loss neural network further includes adjusting, based on website signatures output by the contrastive loss neural network, weights of the contrastive loss neural network.

At 730, the server computer system applies a clustering algorithm to a signature vector for the unknown website and signature vectors for respective ones of a plurality of known websites output by the trained neural network. In some embodiments, the clustering algorithm is a density-based spatial clustering of applications with noise (DBSCAN) algorithm. In some embodiments, the clustering algorithm is a k-means clustering algorithm.

At 740, the server computer system determines, based on results of the clustering algorithm indicating similarities between signature vectors for the unknown website and one or more of the signature vectors for the plurality of known websites, whether the unknown website is suspicious. In some embodiments, determining suspiciousness includes calculating, based on results of the clustering algorithm, a silhouette score for a cluster in which the unknown website is included. In some embodiments, determining suspiciousness includes classifying the unknown website by inputting a set of features for the cluster into a machine learning classifier, where the set of features includes at least the silhouette score calculated for the cluster. In some embodiments, the machine learning classifier is trained by inputting, for signature vectors for a plurality of websites, one or more of the following clustering features: silhouette scores, size of cluster, distances between signature vectors within a cluster, and distance between different clusters. In some embodiments, the machine learning classifier is further trained by altering, based on output of the machine learning classifier for the signature vectors for the plurality of websites, one or more weights of the machine learning classifier.

In some embodiments, in response to determining that the unknown website is suspicious, the server computer system blocks the unknown website, where blocking the unknown website includes labeling the unknown website as a suspicious website for additional training of the neural network. In some embodiments, prior to generating the feature vector for the unknown entity, the server computer system receives a request to process a transaction at the unknown entity. In some embodiments, determining whether the unknown entity is suspicious further includes calculating, based on results of the clustering algorithm, a distance score for a cluster in which the unknown entity is included. In some embodiments, determining whether the unknown entity is suspicious further includes classifying the unknown entity by inputting a set of features for the cluster into a machine learning classifier, where the set of features includes one or more of: the distance score calculated for the cluster, a size of the cluster, distances between signature vectors within the cluster, and distance between the cluster and other, different clusters.

Example Computing Device

Figure 8:
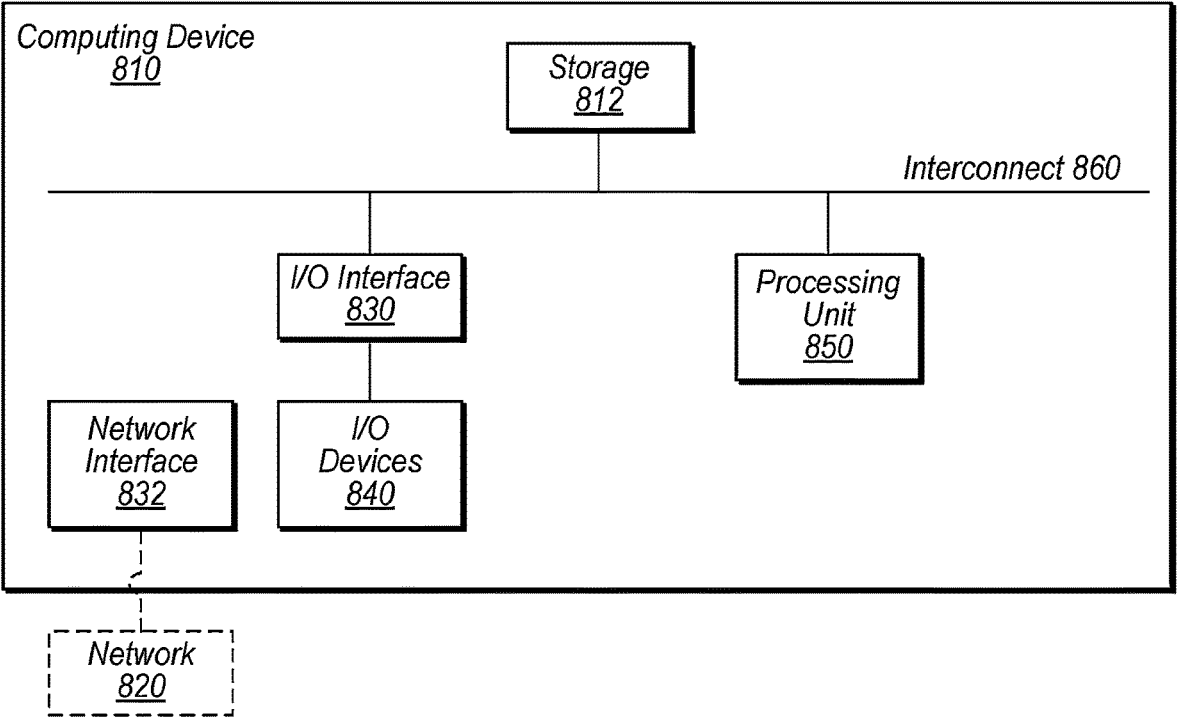
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. In some embodiments, computing device 810 is one example of server computer system 110 or user computing device 222. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f)

during prosecution of a United States patent application based on this disclosure, it will recite claim elements using the "means for" [performing a function] construct.

What is claimed is:

1. A method, comprising:

generating, by a server computer system, a feature vector for an unclassified website, wherein generating the feature vector includes preprocessing a plurality of features of the unclassified website;

inputting, by the server computer system, the feature vector for the unclassified website into a trained neural network;

applying, by the server computer system, a clustering algorithm to a signature vector for the unclassified website and signature vectors for respective ones of a plurality of classified websites output by the trained neural network; and assigning, by the server computer system, a classification from a plurality of classifications to the unclassified website, wherein the assigning is performed based on results of the clustering algorithm indicating similarities between signature vectors for the unclassified website and one or more of the signature vectors for the plurality of classified websites.

2. The method of claim 1, further comprising:

determining, by the server computer system based on the classification assigned to the unclassified website, whether the unclassified website is suspicious.

3. The method of claim 1, wherein assigning the classification to the unclassified website includes:

calculating, based on results of the clustering algorithm indicating similarities between signature vectors for the unclassified website and one or more of the signature vectors for the plurality of classified websites, a silhouette score for a cluster in which the unclassified website is included; and inputting a set of features for the cluster into a machine learning classifier, wherein the set of features includes at least the silhouette score calculated for the cluster.

4. The method of claim 3, wherein the machine learning classifier is trained using clustering features corresponding to signature vectors for a plurality of websites, including one or both of silhouette scores and distance between different clusters.

5. The method of claim 1, wherein training the trained neural network includes:

inputting, into the neural network, a set of training data that includes a feature vector of a given classified website and feature vectors of a given pair of a classified website and an anchor website; and adjusting, based on website signatures output by the neural network, weights of the neural network.

6. The method of claim 5, wherein prior to inputting the set of training data, the server computer system generates feature vectors for respective websites in a set of training websites that includes pairs of classified websites and anchor websites.

7. The method of claim 1, wherein the plurality of features include one of more of the following types of features: cascading style sheets (CSS) classes, JavaScript libraries, hypertext markup language (HTML) tags.

8. The method of claim 1, further comprising, prior to generating the feature vector for the unclassified website:

receiving, by the server computer system, an electronic transaction request submitted via the unclassified website.

9. A non-transitory computer-readable medium having instructions stored thereon that are executable by a server computer system to perform operations comprising:

generating a feature vector for an unclassified entity;

inputting the feature vector for the unclassified entity into a neural network;

applying a clustering algorithm to a signature vector for the unclassified entity and signature vectors for respective ones of a plurality of classified entities output by the neural network; and assigning a classification from a plurality of classifications to the unclassified entity, wherein the assigning is performed based on results of the clustering algorithm indicating similarities between the signature vector for the unclassified entity and one or more of the signature vectors for the plurality of classified entities.

10. The non-transitory computer-readable medium of claim 9, wherein the operations further comprise:

determining, based on the classification assigned to the unclassified entity, whether the unclassified entity is suspicious.

11. The non-transitory computer-readable medium of claim 10, wherein assigning the classification to the unclassified entity includes:

calculating, based on results of the clustering algorithm, a distance score for a cluster in which the unclassified entity is included; and inputting a set of features for the cluster into a machine learning classifier.

12. The non-transitory computer-readable medium of claim 11, wherein the set of features includes one or both of: a size of the cluster and distances between signature vectors within the cluster.

13. The non-transitory computer-readable medium of claim 9, further comprising:

receiving, by the server computer system prior to generating the feature vector for the unclassified entity, a request to process a transaction at the unclassified entity; and based on the classification assigned to the unclassified entity, transmitting, by the server computer system, a decision for the transaction requested by the unclassified entity.

14. The non-transitory computer-readable medium of claim 9, wherein training the neural network includes:

inputting, into the neural network, a set of training data that includes a feature vector of a given classified entity and feature vectors of a given pair of a classified entity and an anchor entity; and adjusting, based on website signatures output by the neural network, weights of the neural network.

15. The non-transitory computer-readable medium of claim 9, wherein the unclassified entity is an unclassified website, and wherein generating the feature vector includes preprocessing a plurality of features of the unclassified website, including one or more of: an IP address and tracking techniques utilized by the unclassified website.

16. A system, comprising:

at least one processor; and a memory having instructions stored thereon that are executable by the at least one processor to cause the system to:

generate a feature vector for an unclassified website, wherein generating the feature vector includes preprocessing a plurality of features of the unclassified website;

input the feature vector for the unclassified website into a machine learning model;

apply a clustering algorithm to a signature vector for the unclassified website and signature vectors for respective ones of a plurality of classified websites output by the machine learning model; and input a set of features for a cluster in which the unclassified website is included into a machine learning classifier, wherein the machine learning classifier determines similarities between signature vectors for the unclassified website and one or more of the signature vectors for the plurality of classified websites; and assign a classification output by the machine learning classifier to the unclassified website.

17. The system of claim 16, wherein the instructions are further executable by the at least one processor to cause the system to:

calculate, based on results of the clustering algorithm, a silhouette score for a cluster in which the unclassified website is included.

18. The system of claim 17, wherein the instructions are further executable by the at least one processor to cause the system to:

input the silhouette score into the machine learning classifier; and determine, based on the classification output by the machine learning classifier based on the silhouette score, whether the website is suspicious.

19. The system of claim 17, wherein the machine learning classifier is trained by:

inputting, for signature vectors for a plurality of websites, a set of clustering features, wherein the set of clustering features includes two or more of: silhouette scores, size of cluster, distances between signature vectors within a cluster, and distance between different clusters.

20. The system of claim 16, wherein the plurality of features include one of a domain registration date and a transport layer security (TLS) certification registration date.

* * * * *